3,137,600
DISSOLUTION OF COPPER
Paul H. Margulies, Princeton, and William J. Tillis, Levittown, N.J., assignors to FMC Corporation, a corporation of Delaware
No Drawing. Filed Sept. 12, 1960, Ser. No. 55,175
5 Claims. (Cl. 156—8)

This invention relates to the dissolution of metallic copper, and particularly to a process of dissolving metallic copper rapidly in readily disposable solutions.

The dissolution of metallic copper is practiced in several commercial areas. One typical application is the production of printed circuits and screens, by a process in which a copper film is selectively dissolved to leave a network of undissolved copper. Another typical example is in the chemical machining of small amounts of copper from the surfaces of fragile or peculiarly shaped objects not susceptible to mechanical machining. Still a further application is in the production of printing plates by photoengraving.

In the past, the agents most commonly used to dissolve copper were the strong mineral acids, for example, nitric or sulfuric acid, ferric chloride solutions, and the like. More recently, aqueous solutions of dipersulfates, commonly caled persulfates, have been developed for the dissolution of copper. However, these agents all have certain disadvantages. For example, the strong acids tend to attack materials used in masking patterns, in the production of printed circuits, screens and the like, and thereby to cause the copper to be dissolved in an ill-defined fashion. Furthermore, these acids are strongly corrosive and require the use of special process equipment. Likewise, the acids generate noxious fumes. Additionally, removal of dissolved copper from the acid solutions is difficult so that disposal of the spent acid solution is a problem.

In the case of the ferric chloride solutions, this agent, in common with the acids, is quite corrosive, requiring the use of special equipment. Furthermore, it generates noxious fumes, and also it must be used at high ferric chloride concentrations, so that when the solution becomes loaded with dissolved copper, solid reaction products form. This interferes with clean copper dissolution. Here again, disposal of the exhausted solution presents a serious problem, and copper recovery from ferric chloride solutions is not feasible.

Aqueous solutions of dipersulfates do not share the disadvantages of the acids and ferric chloride solutions. They are only mildly acidic, they do not generate noxious fumes, and they do not attack masking materials. Likewise, they produce only soluble reaction products, and they can be disposed of readily following simple removal of dissolved copper. However, in order to achieve rates of dissolution with dipersulfates which are competitive with the rates achieved with prior etchants, it has been found necessary to activate the system either by the application of a catalyst, the application of heat, or the application of a catalytic electric potential.

The first of these activating systems, the use of a catalyst for dissolution, is taught in copending patent application Serial No. 633,547, filed January 11, 1957, now U.S. Patent No. 2,978,301. In this application for patent, it is taught that addition of a catalyst such as mercury to the dipersulfate solution markedly increases the rate of dissolution of copper in the solution. This method is quite useful. However, it involves the presence in solution of a secondary material, namely the catalyst, which adheres to the surface of the copper plate after etching, and interferes with subsequent printing or other operations. Furthermore, the catalyst in some cases may constitute a health hazard.

The second method referred to is that of carrying out the dissolution with aqueous dipersulfate solutions, at elevated temperatures. This method is taught in copending patent application Serial No. 723,973, filed March 26, 1958. The use of elevated temperatures substantially increases the dissolution rate, without decomposing undue quantities of persulfate. However, while this method likewise is useful, its widespread acceptance has been hindered because equipment commonly employed in copper etching is not designed for operation at elevated temperatures.

The third method referred to is that of copending patent application Serial No. 51,280, filed August 23, 1960, and bearing the title "Dissolution of Copper," in which it is taught that the application of a catalytic electric potential to the copper which is present in the aqueous dipersulfate solution also increases the rate of dissolution. This method is highly useful; however, special electrical equipment must be employed in its operation.

Accordingly, it has been desired to provide a method and solution for dissolving metallic copper which would have the desirable characteristics of the method and solution employing dipersulfates, for example, their mild acidity, their freedom from noxious fumes, and their ready disposability, yet which would avoid the enumerated disadvantages of the dipersulfates.

It is therefore a feature of the present invention to provide a method of dissolving metallic copper which has the desirable characteristics of the method which employs aqueous dipersulfate solutions, yet which dissolves copper rapidly in the absence of activation.

It has now been found, quite unexpectedly, that aqueous solutions of the ammonium salt of monopersulfuric acid, containing about 10% to 60% by weight, and preferably about 15% to 40% by weight of monopersulfate, at the normal copper dissolution operating temperature of about 20° C. to 45° C. will dissolve copper at a rate amost twice that of an aqueous solution of uncatalyzed ammonium dipersulfate containing an equal amount of active oxygen. The monopersulfate solution also has rate advantages over the dipersulfates at elevated temperatures, and the present process may be operated efficiently at any temperature in the range of about 20° C. to 80° C.

The monopersulfate solution operates to dissolve copper at about the same rate as a corresponding mercury-catalyzed solution of ammonium dipersulfate. This ability of ammonium monopersulfate to dissolve copper rapidly in the absence of activating means, and at ambient temperatures, is quite surprising in view of the fact that its close relatives, potassium monopersulfate and monopersulfuric acid, are largely ineffective in dissolving copper. It would be expected that the various monopersulfates would operate alike.

The monopersulfate solution employed in the present process is an aqueous solution of ammonium monopersulfate in which this ingredient is present in the amount of about 10% to 60%, and preferably about 15% to 40% by weight of the solution. The monopersulfate is a salt of monopersulfuric acid, otherwise known as Caro's acid. The salt is normally produced by neutralization of the acid with ammonium hydroxide, or by the action of hydrogen peroxide on ammonium dipersulfate. The salt has a high degree of solubility in water, and accordingly there is no difficulty in providing the required amount of monopersulfate in solution. Likewise, its high solubility prevents deposition of the monopersulfate by reason of loading of the solution with dissolved copper.

The present process operates at any temperature in the range of about 20° C. to 80° C. With temperatures above about 80° C., the solution may lose active oxygen by reason of decomposition of the monopersulfate. At temperatures substantially below about 20° C., the reaction proceeds quite slowly.

In operation of the present process, metallic copper in the form of foil, blocks, sheets and the like, is dissolved to the extent of about 90% to 100% of the stoichiometric amount of monopersulfate employed. The presence of added impurities tends to decompose the active oxygen present in the monopersulfate, so that the efficiency of dissolution will be reduced. Accordingly, it should be kept in mind that for most efficient operation, the solution should be maintained free of extraneous decomposition agents for the monopersulfate.

The copper metal may be contacted with the aqueous monopersulfate solution by any of the methods commonly employed in the dissolution or chemical machining of copper. Typical methods include immersing the metal in the solution, splashing the monopersulfate solution onto the metal, and spraying the solution onto the metal. It is important only that the solution, while it is in contact with the metallic copper, contain the indicated amount of persulfate.

The present process increases the dissolution rate of copper to the extent that it makes it comparable to the dissolution rate of dipersulfate solutions catalyzed with mercury ions, or activated by an electric potential. This rate is of the same order of magnitude as that obtained with prior commercially employed ferric chloride solutions, so that the present process combines the desirable features of the prior ferric chloride and dipersulfate etchants.

The following examples are given by way of illustration only, and are not intended to limit the operating procedures or materials employed in carrying out the present process.

EXAMPLE 1

Copper panels, measuring 2" x 1" x ¼", were immersed in an ammonium monopersulfate solution containing 17.2 weight percent of the monopersulfate. The panels were rotated at 250 r.p.m. to provide agitation. The temperature of the solution was maintained at about 38° C. to 40° C. The panels were treated by being agitated in the solution for a total time of 22 minutes, divided into three treatments of 2 minutes each, and four treatments of 4 minutes each. After each individual treatment they were rinsed with water, dried and weighed. The average rate of dissolution of the copper is given in Table I which follows.

EXAMPLE 2

The process of Example 1 was repeated, with the exception that an ammonium dipersulfate solution containing 25 weight percent of this dipersulfate, providing an amount of active oxygen equivalent to that in the 17.2 weight percent solution of monopersulfate of Example 1, was employed in place of the ammonium monopersulfate solution. The rate of dissolution obtained with this dipersulfate is given in Table I.

EXAMPLE 3

The procedure of Example 2 was followed with the exception that 5 p.p.m. by weight of a mercury catalyst, namely mercuric chloride, was present in the dipersulfate dissolution bath. The rate of dissolution of the copper in the catalyzed ammonium dipersulfate solution is given in Table I.

EXAMPLE 4

(a) Example 1 was repeated with the exception that potassium monopersulfate was employed in place of the ammonium monopersulfate. The rate of dissolution is given in Table I.

(b) In another test with potassium monopersulfate, 5 p.p.m. of mercury ions, introduced as mercuric chloride, was employed in the copper dissolution test. Results of this test are given in Table I.

EXAMPLE 5

A solution containing 19 weight percent of monopersulfuric acid was employed in the process of Example 1, in place of the ammonium monopersulfate. The rate of dissolution of copper in the solution is given in Table I.

*Table I*

| Solution of Example No. | Agent | Dissolution Rate, mg./sq. in./min. |
|---|---|---|
| 1 | Ammonium Monopersulfate | 50.4 |
| 2 | Ammonium Dipersulfate | 31.7 |
| 3 | Ammonium Dipersulfate+$Hg^{++}$ | 54.0 |
| 4(a) | Potassium Monopersulfate | 16.4 |
| 4(b) | Potassium Monopersulfate+$Hg^{++}$ | 12.6 |
| 5 | Monopersulfuric Acid | 2.9 |

It will be seen that metallic copper dissolves rapidly in an ammonium monopersulfate solution, the rate of dissolution comparing favorably with the rate of dissolution of copper in a mercury-catalyzed ammonium dipersulfate solution. This makes use of the monopersulfate practical in such applications as the manufacture of printed circuits, chemical machining, and the like.

EXAMPLE 6

A typical printed circuit board was etched according to the present process. A phenolic resin impregnated fiber printed circuit board was provided, having a .0028" thick copper foil adhesively laminated to its face. The copper foil had an electrical circuit pattern masked on its face with a masking material inert to aqueous persulfate solution, in this case an ink coating provided by the silk screen method. The board was placed in a three-gallon paddle etcher manufactured by the Master Etching Machine Co., Wyncot, Pennsylvania. An aqueous, 25% solution of ammonium monopersulfate contained the amount of three gallons in the paddle etcher, and maintained at about 40° C., was splashed onto the partially masked copper surface on the board.

After about three minutes, the copper was observed to have been dissolved completely from the board in non-masked areas, and the board was removed from the paddle etcher and washed with water.

The masking ink thereafter was removed from the remaining copper foil with acetone. The resulting board had a well-defined electrical circuit in the form of the remaining copper foil, and the fiber board was not damaged in any way by the dissolving treatment.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Method of dissolving metallic copper, comprising contacting the copper with an aqueous solution consisting essentially of about 10% to 60% by weight of ammonium monopersulfate.

2. Method of dissolving metallic copper, comprising contacting the copper with an aqueous solution consisting essentially of about 15% to 40% by weight of ammonium monopersulfate.

3. Method of claim 1 in which the temperature of the solution during dissolution of the copper is maintained at about 20° C. to 80° C.

4. In the method of producing a printed circuit by masking the desired circuit areas on the face of a copper foil laminated to a fiber board and thereafter dissolving said copper foil in areas which are not masked, the improvement which comprises effecting said dissolving by contacting said copper with an aqueous solution consisting essentially of about 10% to 60% by weight of ammonium monopersulfate.

5. Method of claim 4 in which the temperature of the aqueous solution during dissolution of the copper is maintained at about 20° C. to 80° C.

References Cited in the file of this patent

UNITED STATES PATENTS

| | | |
|---|---|---|
| 2,678,876 | Burnside | May 18, 1954 |
| 2,912,312 | Japel | Nov. 10, 1959 |
| 2,942,954 | Thomas | June 28, 1960 |
| 2,955,020 | Darbee et al. | Oct. 4, 1960 |
| 2,978,301 | Margulies et al. | Apr. 4, 1961 |

OTHER REFERENCES

"Formica Copper Clad," published by the Formica Co., 1954, p. 4 relied on.